US010369533B2

(12) United States Patent
Whitten et al.

(10) Patent No.: US 10,369,533 B2
(45) Date of Patent: Aug. 6, 2019

(54) DOSING AND MIXING ARRANGEMENT FOR USE IN EXHAUST AFTERTREATMENT

(71) Applicant: Donaldson Company, Inc., Minneapolis, MN (US)

(72) Inventors: Matthew S. Whitten, St. Paul, MN (US); Bruce Bernard Hoppenstedt, Scandia, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 548 days.

(21) Appl. No.: 15/021,567

(22) PCT Filed: Sep. 12, 2014

(86) PCT No.: PCT/US2014/055404

§ 371 (c)(1),
(2) Date: Mar. 11, 2016

(87) PCT Pub. No.: WO2015/038897

PCT Pub. Date: Mar. 19, 2015

(65) Prior Publication Data

US 2017/0282135 A1 Oct. 5, 2017

Related U.S. Application Data

(60) Provisional application No. 61/877,749, filed on Sep. 13, 2013.

(51) Int. Cl.
*F02K 1/38* (2006.01)
*B01F 5/04* (2006.01)
(Continued)

(52) U.S. Cl.
CPC .................. *B01F 5/04* (2013.01); *B01F 3/04* (2013.01); *B01F 3/04049* (2013.01); *B01F 5/00* (2013.01);
(Continued)

(58) Field of Classification Search
CPC ................ B01F 2005/0011; B01F 3/04; B01F 3/04049; B01F 5/00; B01F 5/0057;
(Continued)

(56) References Cited

U.S. PATENT DOCUMENTS 2,511,597 A 6/1950 Marx
3,651,888 A * 3/1972 Andres .................. F01N 1/084 181/265
(Continued)

FOREIGN PATENT DOCUMENTS

EP 2111916 A1 10/2009
EP 2128398 A1 12/2009

OTHER PUBLICATIONS

International Search Report for PCT/US2014/055404, dated Nov. 21, 2014.

*Primary Examiner* — Jesse S Bogue
(74) *Attorney, Agent, or Firm* — Merchant & Gould P.C.

(57) ABSTRACT

Dosing and mixing exhaust gas includes directing exhaust gas towards a periphery of a mixing tube that is configured to direct the exhaust gas to flow around and through the mixing tube to effectively mix and dose exhaust gas within a relatively small area. Some mixing tubes include a slotted region and a non-slotted region. Some mixing tubes include a louvered region and a non-louvered region. Some mixing tubes are offset within a mixing region of a housing.

21 Claims, 9 Drawing Sheets

(51) Int. Cl.

| | |
|---|---|
| ***B01F 5/00*** | (2006.01) |
| ***B01F 3/04*** | (2006.01) |
| ***F01N 3/20*** | (2006.01) |
| *F01N 3/10* | (2006.01) |
| *F01N 3/28* | (2006.01) |
| *F01N 1/08* | (2006.01) |
| *F01N 3/035* | (2006.01) |
| *F01N 13/00* | (2010.01) |

(52) U.S. Cl.

CPC .......... *B01F 5/0057* (2013.01); *B01F 5/0451* (2013.01); *F01N 3/20* (2013.01); *B01F 2005/0011* (2013.01); *B01F 2005/0091* (2013.01); *F01N 1/088* (2013.01); *F01N 3/035* (2013.01); *F01N 3/106* (2013.01); *F01N 3/2066* (2013.01); *F01N 3/2892* (2013.01); *F01N 13/009* (2014.06); *F01N 2240/20* (2013.01); *F01N 2470/18* (2013.01); *F01N 2610/02* (2013.01)

(58) Field of Classification Search

CPC ........ B01F 5/04; B01F 5/0451; F01N 13/009; F01N 1/088; F01N 2240/20; F01N 2470/18; F01N 2610/02; F01N 3/035; F01N 3/106

See application file for complete search history.

(56) References Cited

U.S. PATENT DOCUMENTS

| | | | | |
|---|---|---|---|---|
| 7,877,983 | B2 * | 2/2011 | Kunkel | B01F 3/04049 239/418 |
| 8,539,761 | B2 | 9/2013 | Lebas et al. | |
| 8,915,064 | B2 | 12/2014 | Blaisdell et al. | |
| 8,939,638 | B2 * | 1/2015 | Palmer | B01F 5/0473 366/337 |
| 9,062,589 | B2 * | 6/2015 | Katou | F01N 3/106 |
| 9,217,348 | B2 * | 12/2015 | Kimura | F01N 3/2066 |
| 9,435,240 | B2 * | 9/2016 | Sampath | F01N 3/206 |
| 9,528,415 | B2 * | 12/2016 | Brandl | B01F 5/0268 |
| 9,604,170 | B2 * | 3/2017 | Kimura | B01F 5/0065 |
| 9,670,811 | B2 * | 6/2017 | De Rudder | B01F 3/04049 |
| 2009/0313979 | A1 * | 12/2009 | Kowada | B01D 53/9431 60/297 |
| 2010/0146950 | A1 * | 6/2010 | Hayashi | B01D 53/9431 60/301 |
| 2011/0308234 | A1 | 12/2011 | De Rudder et al. | |
| 2013/0164181 | A1 * | 6/2013 | Iijima | F01N 3/2066 422/169 |
| 2014/0116037 | A1 | 5/2014 | Lebas et al. | |
| 2014/0230411 | A1 | 8/2014 | De Rudder et al. | |
| 2015/0211404 | A1 | 7/2015 | Blaisdell et al. | |

* cited by examiner

DOSING AND MIXING ARRANGEMENT FOR USE IN EXHAUST AFTERTREATMENT

CROSS-REFERENCE TO RELATED APPLICATION(S)

This application is a US National Stage application of PCT International Patent application No. PCT/US2014/055404, filed Sep. 12, 2014, which claims priority to U.S. Provisional Patent Application Ser. No. 61/877,749 filed on Sep. 13, 2013, which applications are incorporated herein by reference. To the extent appropriate, a claim of priority is made to each of the above applications.

BACKGROUND

Vehicles equipped with internal combustion engines (e.g., diesel engines) typically include exhaust systems that have aftertreatment components such as selective catalytic reduction (SCR) catalyst devices, lean NOx catalyst devices, or lean NOx trap devices to reduce the amount of undesirable gases, such as nitrogen oxides (NOx) in the exhaust. In order for these types of aftertreatment devices to work properly, a doser injects reactants, such as urea, ammonia, or hydrocarbons, into the exhaust gas. As the exhaust gas and reactants flow through the aftertreatment device, the exhaust gas and reactants convert the undesirable gases, such as NOx, into more acceptable gases, such as nitrogen and water. However, the efficiency of the aftertreatment system depends upon how evenly the reactants are mixed with the exhaust gases. Therefore, there is a need for a flow device that provides a uniform mixture of exhaust gases and reactants.

SCR exhaust treatment devices focus on the reduction of nitrogen oxides. In SCR systems, a reductant (e.g., aqueous urea solution) is dosed into the exhaust stream. The reductant reacts with nitrogen oxides while passing through an SCR substrate to reduce the nitrogen oxides to nitrogen and water. When aqueous urea is used as a reductant, the aqueous urea is converted to ammonia which in turn reacts with the nitrogen oxides to covert the nitrogen oxides to nitrogen and water. Dosing, mixing and evaporation of aqueous urea solution can be challenging because the urea and by-products from the reaction of urea to ammonia can form deposits on the surfaces of the aftertreatment devices. Such deposits can accumulate over time and partially block or otherwise disturb effective exhaust flow through the aftertreatment device.

SUMMARY

An aspect of the present disclosure relates to a method for dosing and mixing exhaust gas in exhaust aftertreatment. Another aspect of the present disclosure relates to a dosing and mixing unit for use in exhaust aftertreatment. More specifically, the present disclosure relates to a dosing and mixing unit including a mixing tube configured to direct exhaust gas flow to flow around and through the mixing tube to effectively mix and dose exhaust gas within a relatively small area.

In accordance with some aspects, the mixing tube includes a slotted region and a non-slotted region. In examples, the slotted region extends over a majority of a circumference of the mixing tube. In examples, the slotted region extends over a majority of an axial length of the mixing tube. In examples, a circumferential width of the non-slotted region is substantially larger than a circumferential width of a gap between slots of the slotted region.

In accordance with some aspects, the mixing tube includes a louvered region and a non-louvered region. The louvered region extends over a majority of a circumference of the mixing tube. In examples, the louvered region extends over a majority of an axial length of the mixing tube. In examples, a circumferential width of the non-slotted region is substantially larger than a circumferential width of a gap between louvers of the louvered region.

In accordance with some aspects, the mixing tube is offset within a mixing region of a housing. For example, the mixing tube can be located closer to one wall of the housing than to an opposite wall of the housing.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
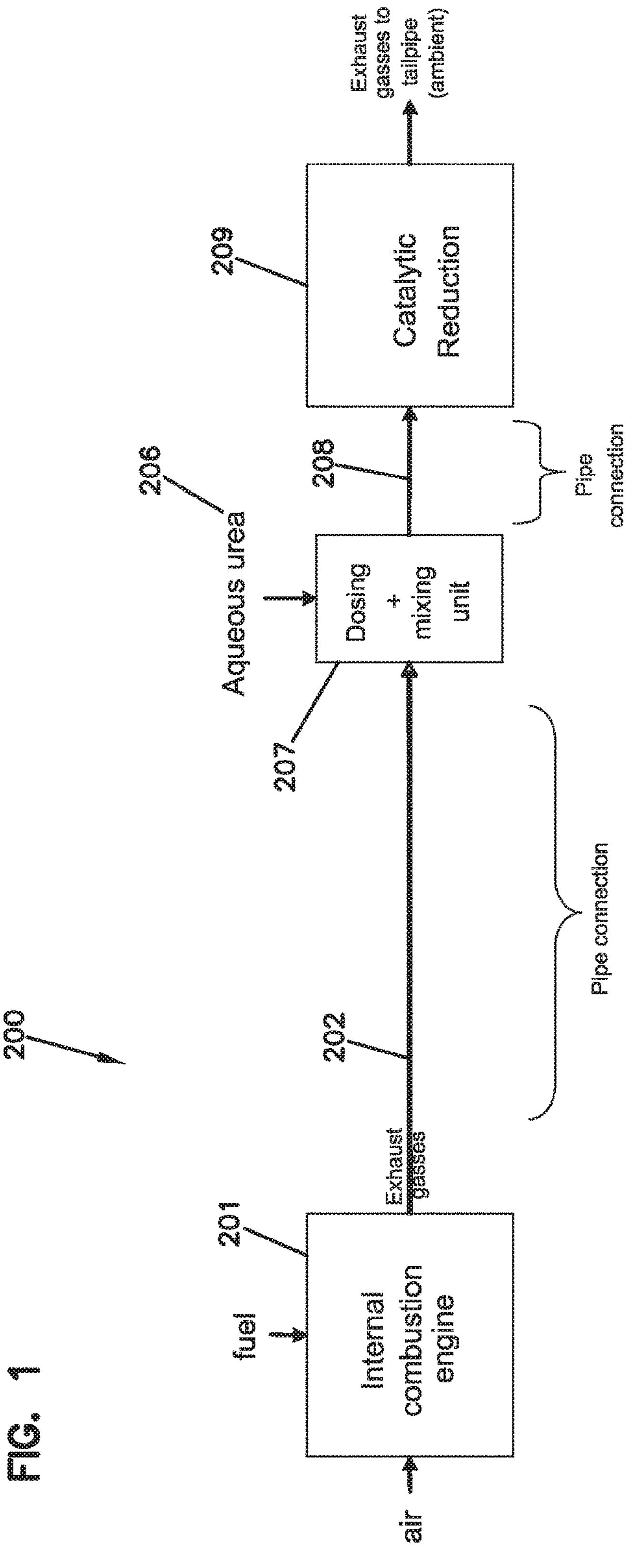
FIG. 1 is a schematic representation of a first exhaust treatment system incorporating a doser and mixing unit in accordance with the principles of the present disclosure.
Figure 2:
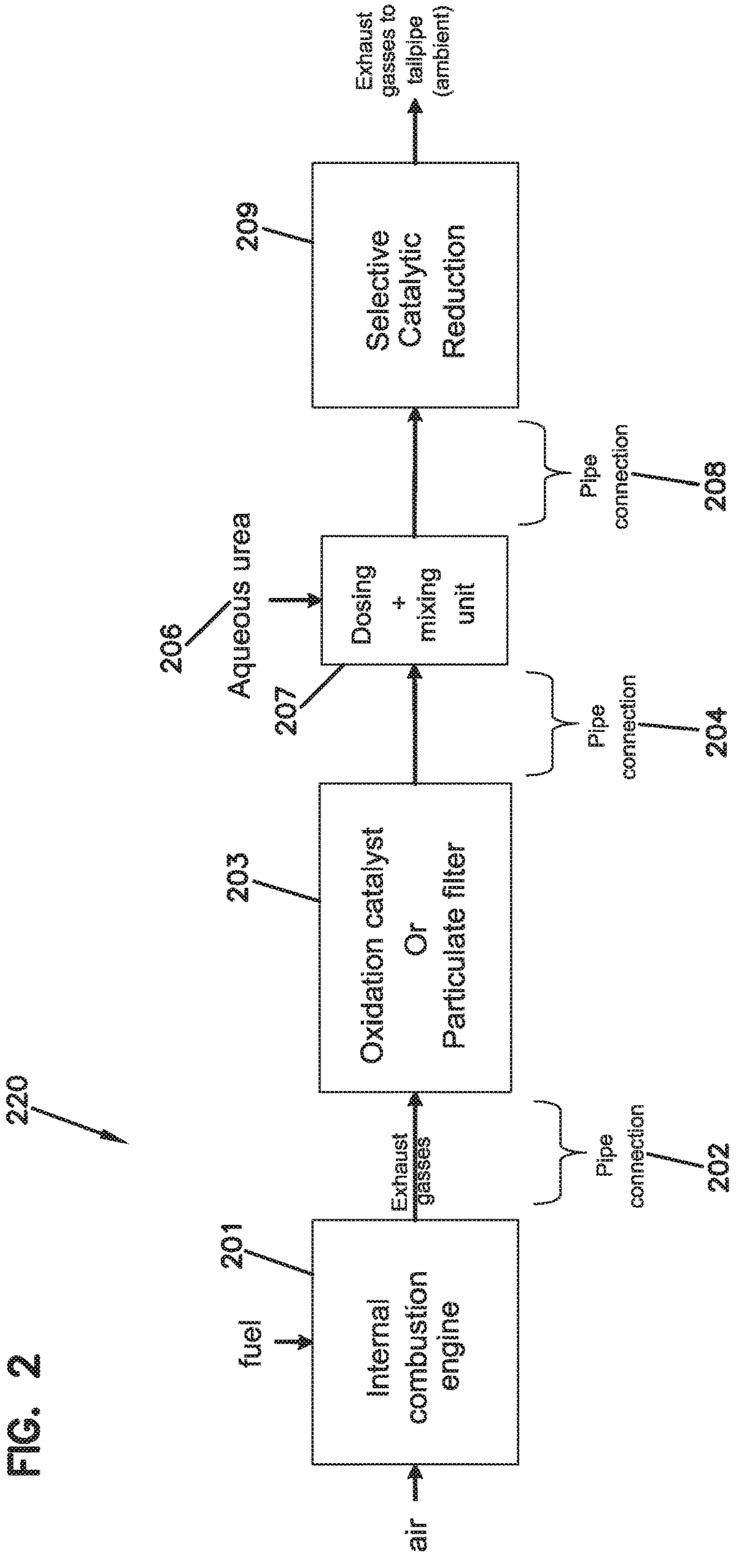
FIG. 2 is a schematic representation of a second exhaust treatment system incorporating a doser and mixing unit in accordance with the principles of the present disclosure.
Figure 3:
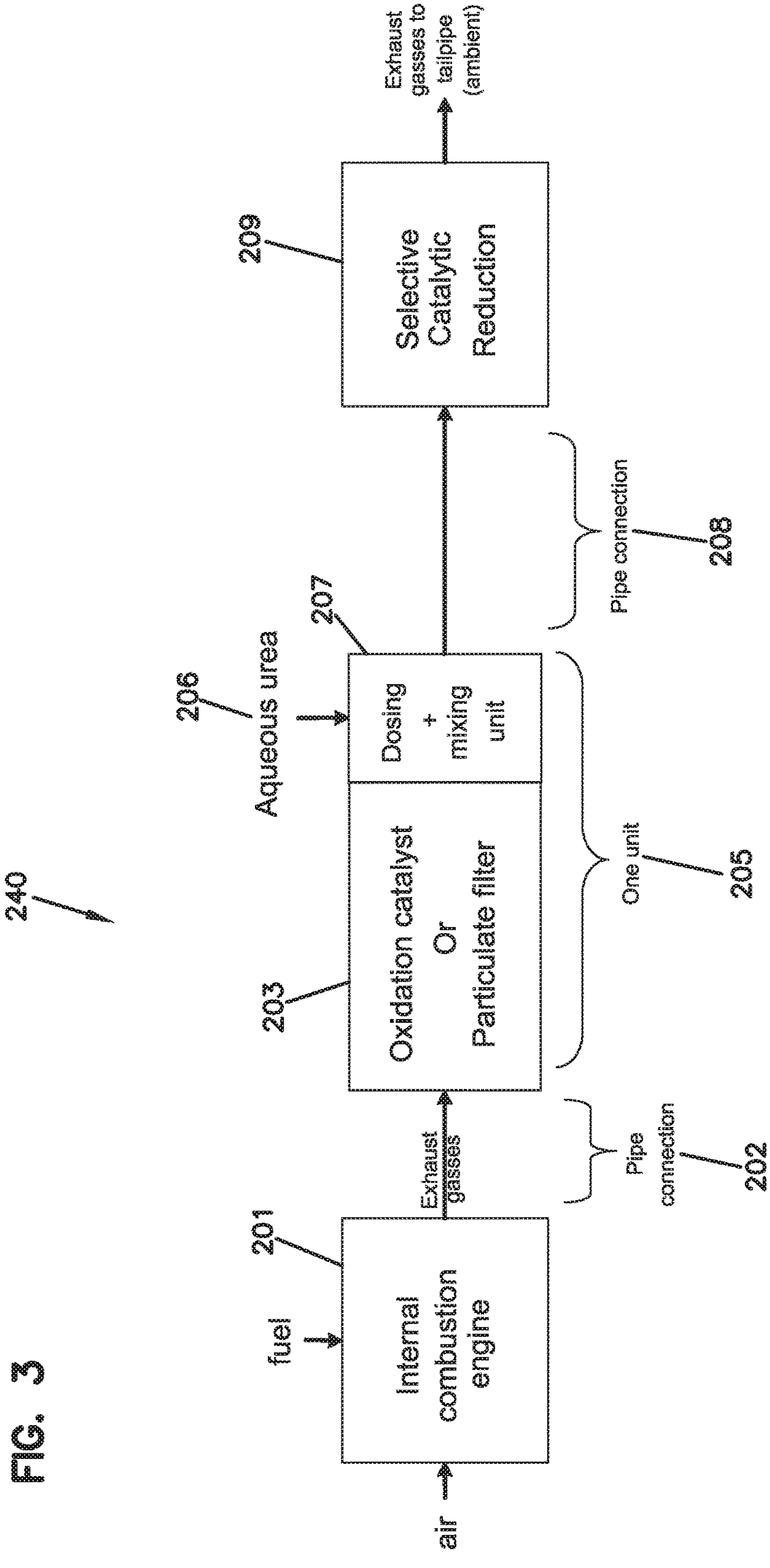
FIG. 3 is a schematic representation of a third exhaust treatment system incorporating a doser and mixing unit in accordance with the principles of the present disclosure.

FIGS. 1-3 illustrate various exhaust flow treatment systems including an internal combustion engine 201 and a dosing and mixing unit 207. FIG. 1 shows a first treatment system 200 in which a pipe 202 carries exhaust from the engine 201 to the dosing and mixing unit 207, where reactant (e.g., aqueous urea) is injected (at 206) into the exhaust stream and mixed with the exhaust stream. A pipe 208 carries the exhaust stream containing the reactant from the dosing and mixing unit 207 to a treatment substrate (e.g., an SCR device) 209 where nitrogen oxides are reduced to nitrogen and water.

FIG. 2 shows an alternative system 220 that is substantially similar to the system 200 of FIG. 1 except that a separate aftertreatment substrate 203 (e.g., a Diesel Particulate Filter (DPF) or Diesel Oxidation Catalyst (DOC)) is positioned between the engine 201 and the dosing and mixing unit 207. The pipe 202 carries the exhaust stream from the engine 201 to the aftertreatment substrate 203 and another pipe 204 carries the treated exhaust stream to the dosing and mixing device 207. FIG. 3 shows an alternative system 240 that is substantially similar to the system 220 of FIG. 2 except that the aftertreatment device 203 is combined with the dosing and mixing unit 207 as a single unit 205.

A selective catalytic reduction (SCR) catalyst device is typically used in an exhaust system to remove undesirable gases such as nitrogen oxides (NOx) from the vehicle's emissions. SCR's are capable of converting NOx to nitrogen and oxygen in an oxygen rich environment with the assistance of reactants such as urea or ammonia, which are injected into the exhaust stream upstream of the SCR through a doser. In alternative implementations, other aftertreatment devices such as lean NOx catalyst devices or lean NOx traps could be used in place of the SCR catalyst device, and other reactants (e.g., hydrocarbons) can be dispensed by the doser.

A lean NOx catalyst device is also capable of converting NOx to nitrogen and oxygen. In contrast to SCR's, lean NOx catalysts use hydrocarbons as reducing agents/reactants for conversion of NOx to nitrogen and oxygen. The hydrocarbon is injected into the exhaust stream upstream of the lean NOx catalyst. At the lean NOx catalyst, the NOx reacts with the injected hydrocarbons with the assistance of a catalyst to reduce the NOx to nitrogen and oxygen. While the exhaust treatment systems 200, 220, 240 are described as including an SCR, it will be understood that the scope of the present disclosure is not limited to an SCR as there are various catalyst devices (a lean NOx catalyst substrate, a SCR substrate, a SCRF substrate (i.e., a SCR coating on a particulate filter), and a NOx trap substrate) that can be used in accordance with the principles of the present disclosure.

The lean NOx traps use a material such as barium oxide to absorb NOx during lean burn operating conditions. During fuel rich operations, the NOx is desorbed and converted to nitrogen and oxygen by reaction with hydrocarbons in the presence of catalysts (precious metals) within the traps.

Figure 4:
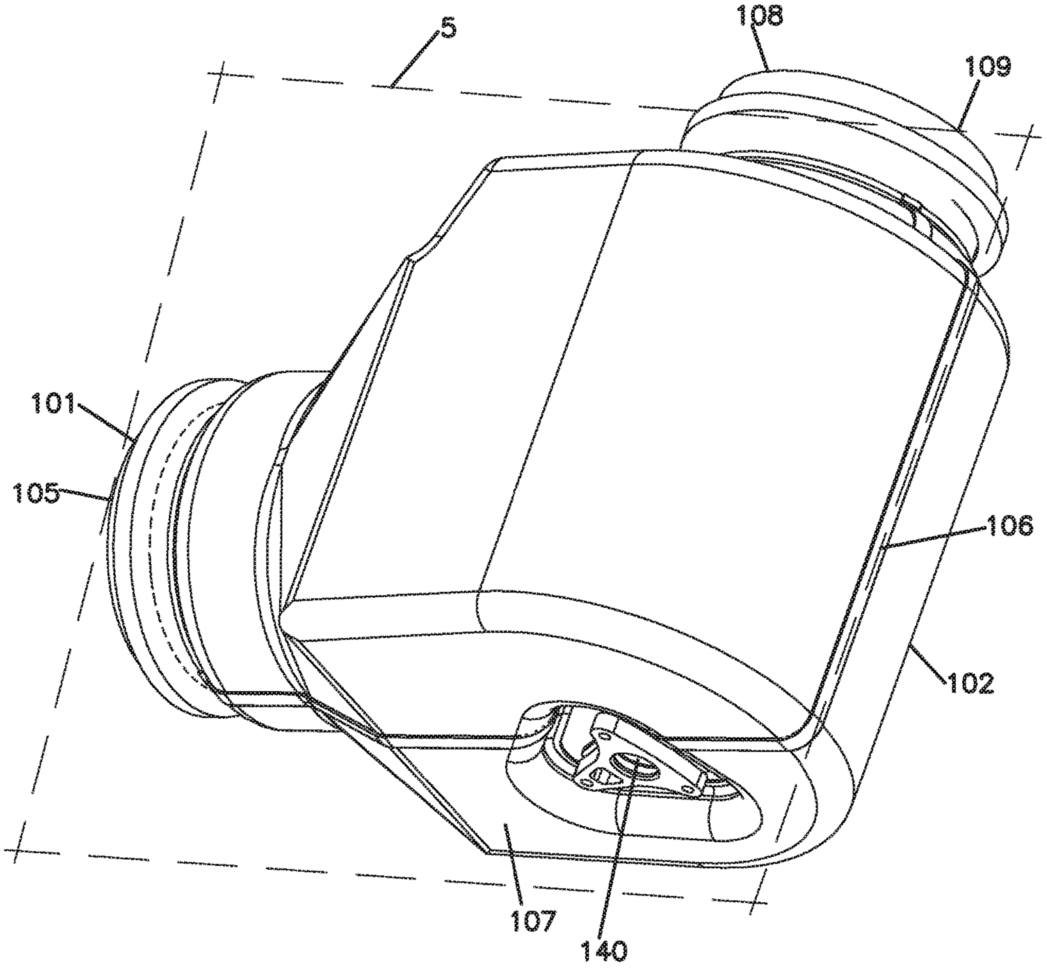
FIG. 4 is a perspective view of an example doser and mixing unit configured in accordance with the principles of the present disclosure.
Figure 5:
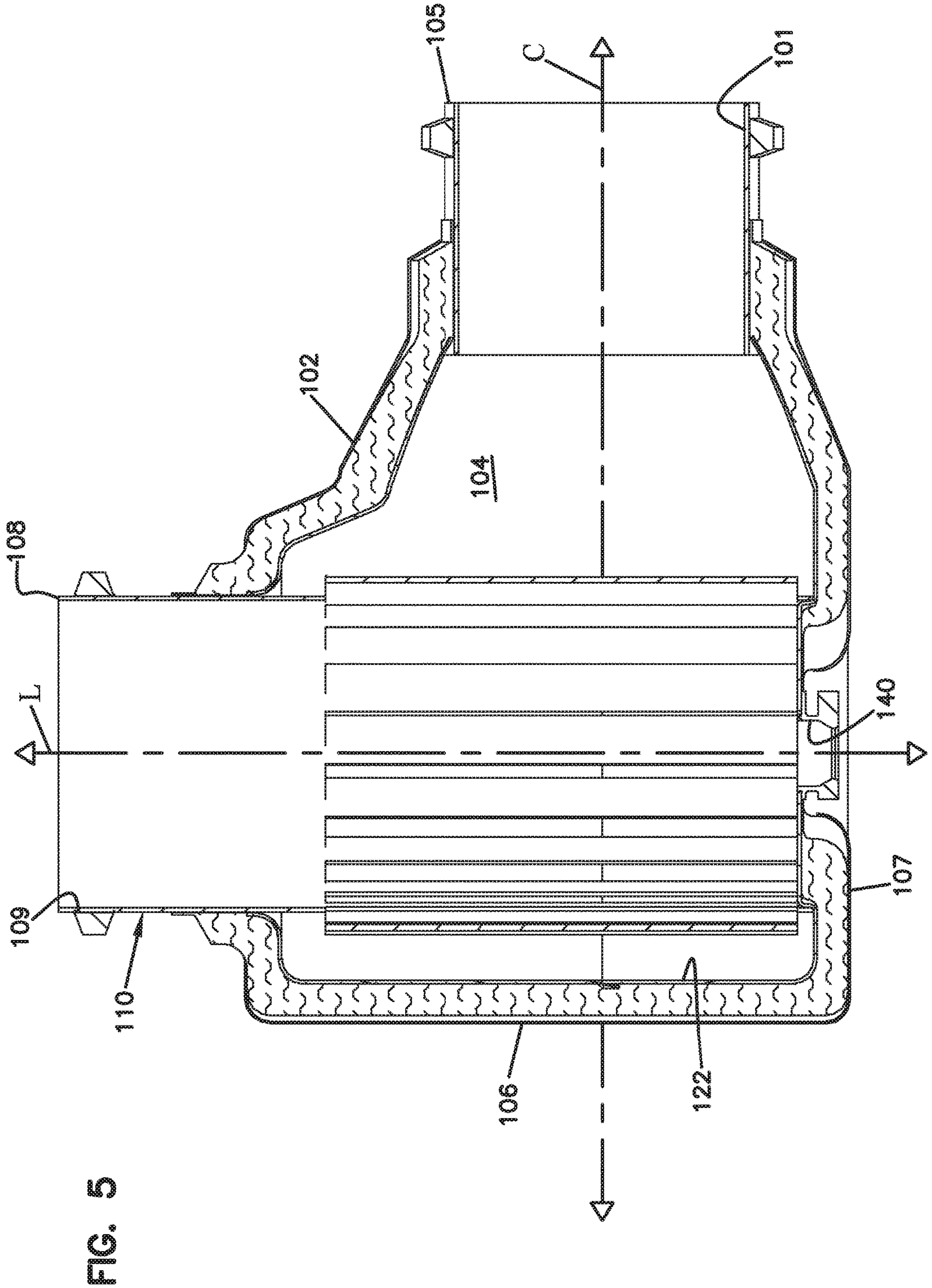
FIG. 5 is a cross-sectional view of the doser and mixing unit of FIG. 4 taken along the plane 5 of FIG. 4.
Figure 6:
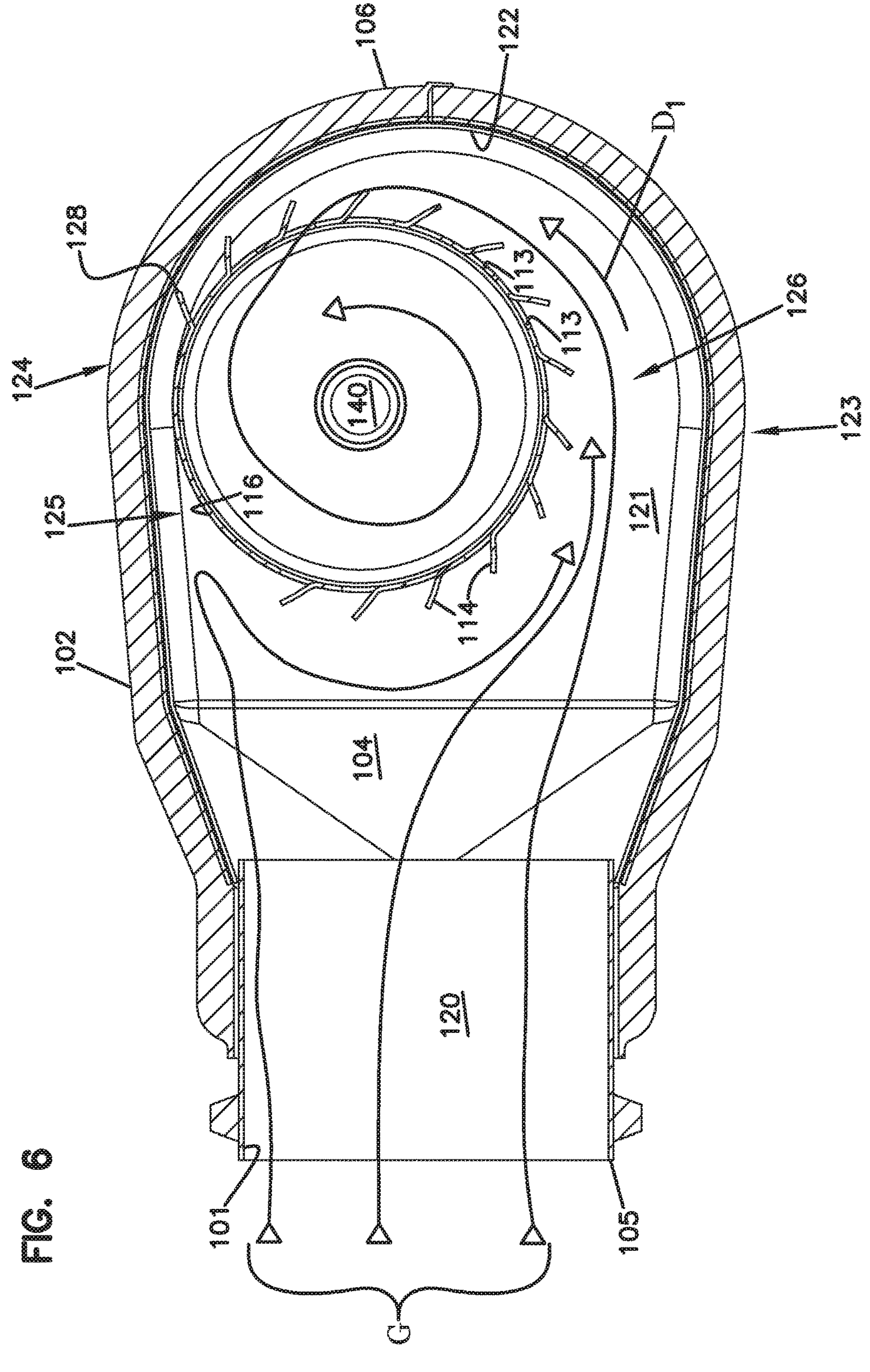
FIG. 6 is a cross-sectional view of the doser and mixing unit of FIG. 4 taken along the housing axis C shown in FIG. 5.

FIGS. 4-6 show a dosing and mixing unit 100 suitable for use as dosing and mixing unit 207 in the treatment systems disclosed above. The dosing and mixing unit 100 includes a housing 102 having an interior 104 accessible through an inlet 101 and an outlet 109. A mixing tube arrangement 110 is disposed within the interior 104 (see FIGS. 5 and 6). With reference to the treatment systems 200, 220, 240, the inlet 101 receives exhaust flow from the engine 201 (or the treatment substrate 203) and the outlet 109 leads to the SCR 209. In certain implementations, the treatment substrate 203 also can be disposed within the housing 102 to form the combined unit 205 of FIG. 3.

As shown in FIG. 5, the housing 102 extends from a first end 105 to a second end 106 along a housing axis C. In an example, the housing axis C (i.e., an inlet axis) defines a flow axis for the inlet 101. The housing 102 also extends from a third end 107 to a fourth end 108 along a longitudinal axis L (i.e., outlet axis) of the mixing tube arrangement 110. In certain implementations, the housing axis C is not centered between the third and fourth ends 107, 108. In an example, the housing axis C is located closer to the third end 107. In certain implementations, the longitudinal axis L is not centered between the first and second ends 105, 106. In an example, the longitudinal axis L is located closer to the second end 106.

In an example, the longitudinal axis L defines a flow axis for the outlet 109. In certain implementations, the second end 106 is closed. In certain implementations, the second end 106 is curved to define a contoured interior surface 122. In an example, the second end 106 defines half of a cylindrical shape. In certain implementations, the third end 107 defines a port 140 at which a doser can be coupled (see FIG. 4). In other implementations, a doser can be disposed within the housing 102 at the third end 107.

As shown in FIG. 6, the housing 102 also has a first side 123 and a second side 124 that extend between the first and second ends 105, 106 and between the third and fourth ends 107, 108. In certain implementations, the first and second sides 123, 124 are closed. The closed second end 106 contours between the first and second sides 123, 124 (see FIG. 6). As shown in FIG. 6, the interior 104 of the housing 102 defines an inlet region 120 having a first volume and a mixing region 121 having a second, larger volume. The mixing region 121 extends from the inlet region 120 to the second end 106 of the housing 102. The mixing tube arrangement 110 is disposed within the mixing region 121.

As shown in FIG. 6, exhaust gas G flows from the inlet 101 towards the second end 106 of the housing 102. As the exhaust gas G approaches the mixing tube arrangement 110, some of the exhaust gas G begins to swirl within the housing interior 104. The mixing tube arrangement 110 causes the exhaust gas G to swirl about the longitudinal axis L (FIG. 5) of the mixing tube arrangement 110. In certain implementations, the mixing tube arrangement 110 defines slots 113 (which will be discussed in more detail below) through which the exhaust gas G enters the mixing tube arrangement 110. In certain implementations, the mixing tube arrangement 110 includes louvers 114 (which will be discussed in more detail below) that direct the exhaust gas G through the slots 113 in a swirling flow along a first circumferential direction D1 (FIG. 6).

A doser (or doser port) is disposed at one end of the mixing tube arrangement 110 (see FIG. 5). The doser is configured to inject reactant (e.g., aqueous urea) into the swirling flow G. Examples of the reactant include, but are not limited to, ammonia, urea, or a hydrocarbon. The doser can be aligned with the longitudinal axis L of the mixing tube arrangement 110 so as to generate a spray pattern concentric about the axis L. In other embodiments, the reactant doser may be positioned upstream from the mixing tube arrangement 110 or downstream from the mixing tube arrangement 110. The opposite end of the mixing tube arrangement 110 defines the outlet 109 of the unit 100. Accordingly, the reactant and exhaust gas mixture is directed in a swirling flow out through the outlet 109 of the housing 102.

In other implementations, the dosing and mixing unit 100 can be used to mix hydrocarbons with the exhaust to reactivate a diesel particulate filter (DPF). In such implementations, the reactant doser injects hydrocarbons into the gas flow within the mixing tube arrangement 110. The mixed gas leaves the mixing tube arrangement 110 and is directed to a downstream diesel oxidation catalyst (DOC) at which the hydrocarbons ignite to heat the exhaust gas. The heated gas is then directed to the DPF to burn particulate clogging the filter.

In some implementations, the mixing tube arrangement 110 is offset within the mixing region 121. For example, the mixing tube arrangement 110 can be disposed so that a cross-sectional area of the annulus is decreasing as the flow travels along a perimeter of the mixing tube arrangement 110. In the example shown, the mixing tube arrangement is located closer to the second side 124 than to the first side 123. In other implementations, however, the mixing tube arrangement 110 can be located closer to the first side 123. In some implementations, offsetting the mixing tube arrangement 110 guides the exhaust flow in the first circumferential direction D1. In some implementations, offsetting the mixing tube arrangement 110 inhibits exhaust gases G from flowing in an opposite circumferential direction.

For example, offsetting the mixing tube arrangement may create a high pressure zone 125 and a flow zone 126. The high pressure zone 125 is defined where the mixing tube arrangement 110 approaches the closest side (e.g., the second side 124). As the exterior surface of the mixing tube arrangement 110 approaches the housing side 124, less flow can pass between the mixing tube arrangement 110 and the side 124. Accordingly, the flow pressure builds and directs the exhaust gases away from the high pressure zone 125. The flow zone 126 is defined along the portions of the mixing tube 110 that are spaced farther from the wall (e.g., side wall 123, interior surface 122), thereby enabling flow between the mixing tube arrangement 110 and the wall.

In certain implementations, a portion of the mixing tube arrangement 110 contacts the closest side wall (e.g., side wall 124). For example, a distal end of a louver 114 (see FIGS. 7-9) of the mixing tube arrangement 110 may contact (see 128 of FIG. 6) the closest side wall 124. In such implementations, the contact 128 between the mixing tube arrangement 110 and the wall 124 further inhibits (or blocks) flow in the opposite circumferential direction.

Figure 7:
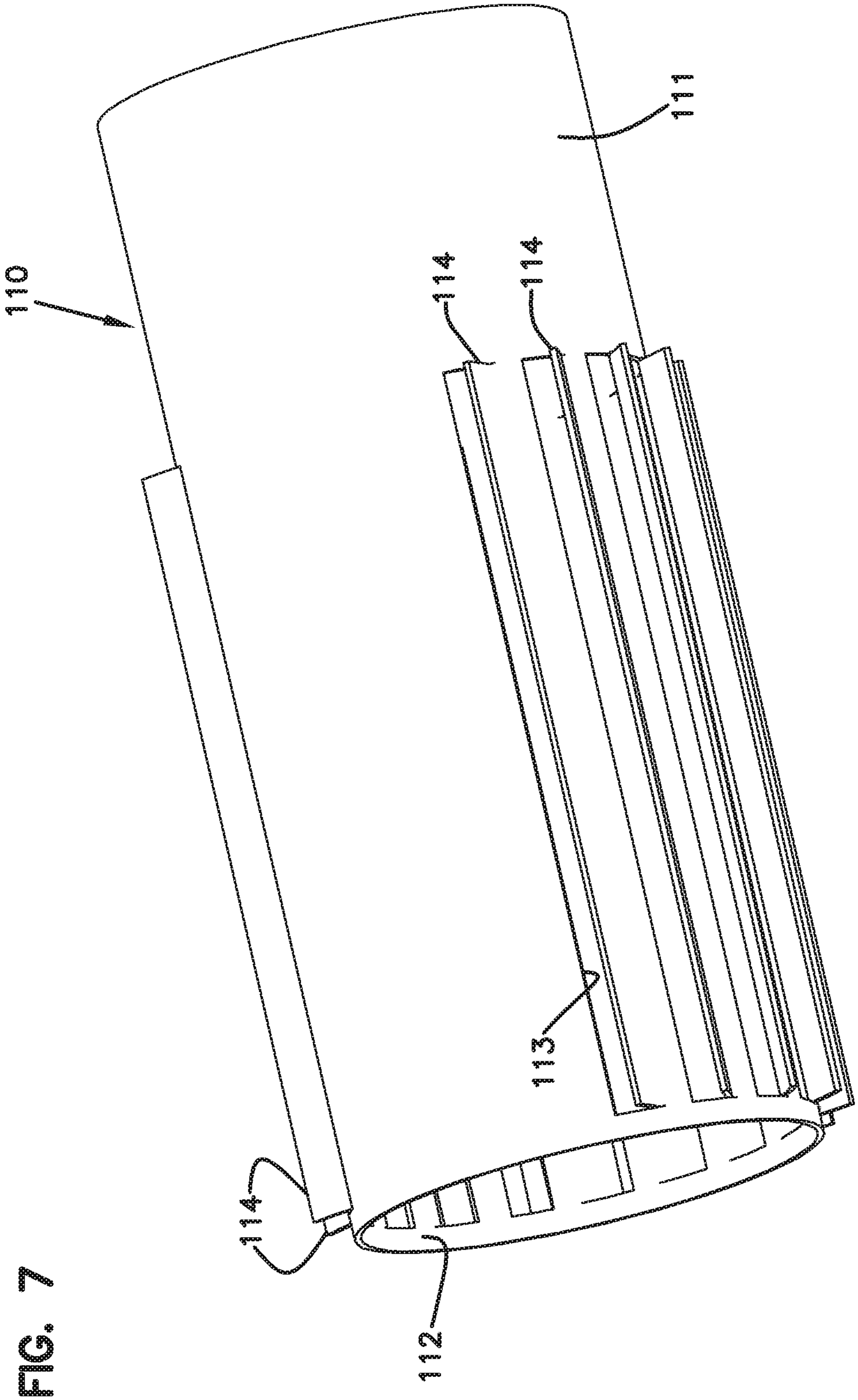
FIG. 7 is a perspective view of an example mixing tube arrangement suitable for use with the doser and mixing unit of FIG. 4.
Figure 8:
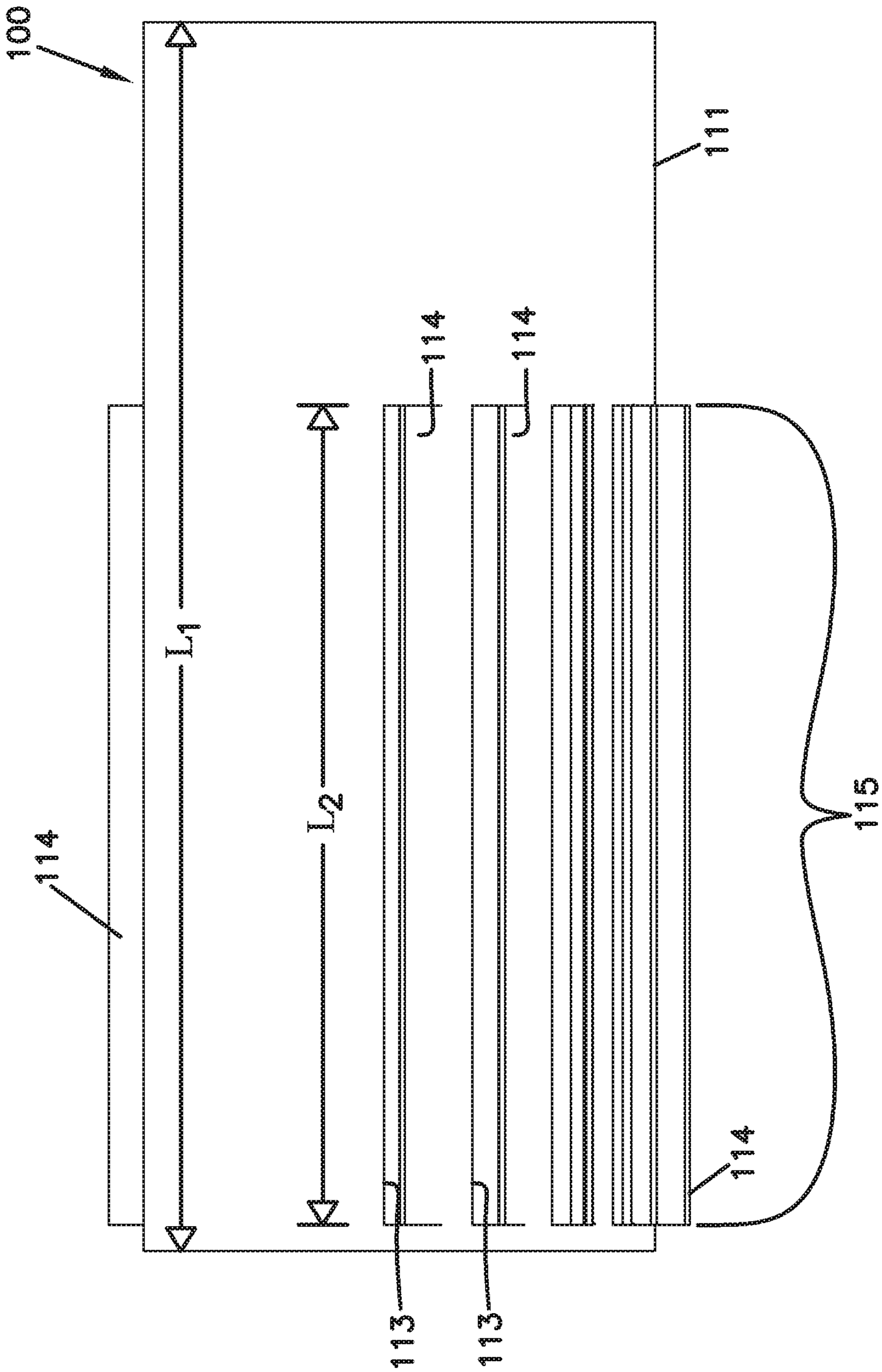
FIG. 8 is a side elevational view of the mixing tube arrangement of FIG. 7.
Figure 9:
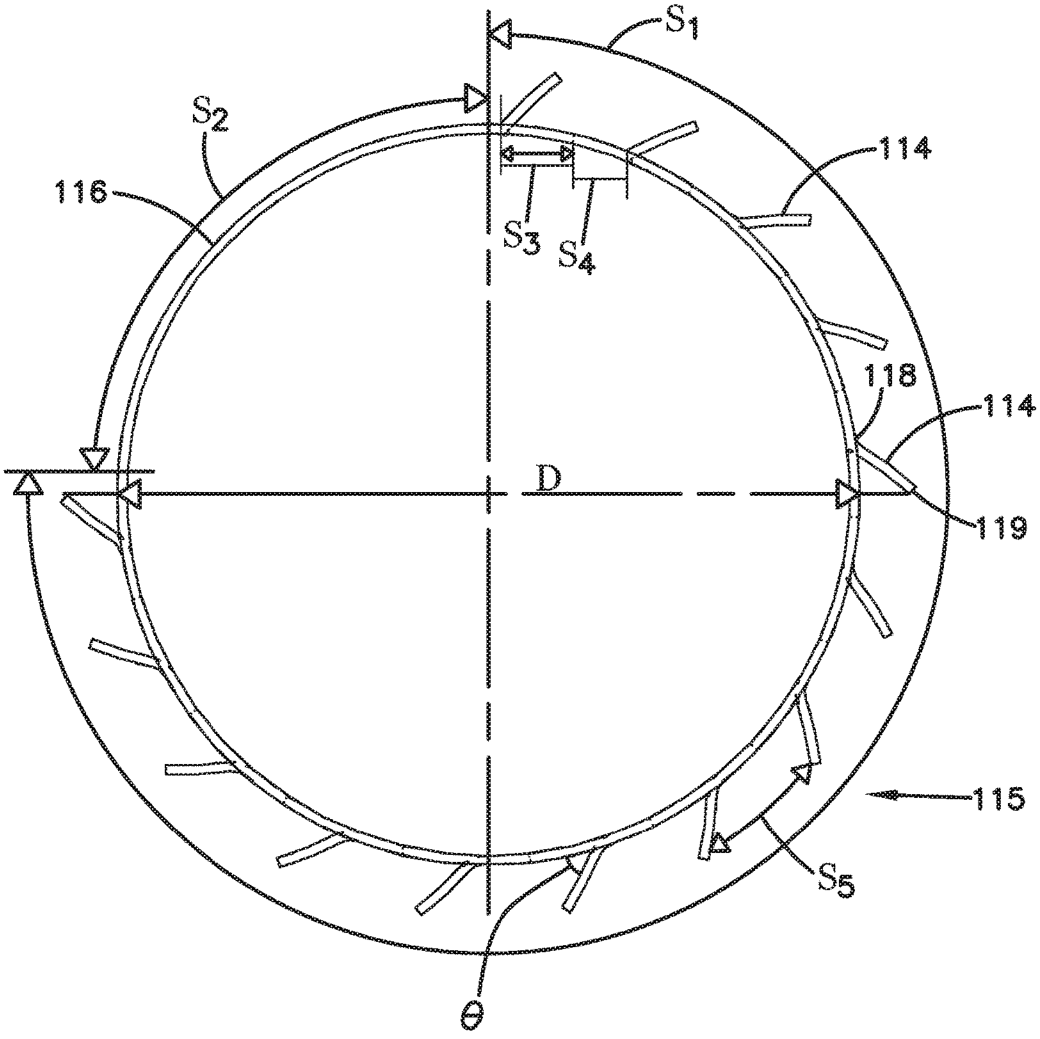
FIG. 9 is an end view of the mixing tube arrangement of FIG. 7.

FIGS. 7-9 illustrate one example mixing tube arrangement 110 including a tube body 111 defining a hollow interior 112. The tube body 111 has a length L1. The tube body 111 has a slotted region 115 extending over a portion of the tube body 111. One or more slots 113 are defined through a circumferential surface of the tube body 111 at the slotted region 115. The slots 113 lead from an exterior of the tube body 111 into the interior 112 of the tube body 111. In some implementations, the slots 113 include axially-extending slots 113. In certain implementations, the tube body 111 defines no more than one axial slot 113 per radial position along the circumference of the tube body 111. In certain implementations, the slotted region 115 includes portions of the tube body 111 extending circumferentially between the slots 113 in the slotted region 115.

In some implementations, the slotted region 115 defines multiple slots 113. In certain implementations, the slotted region 115 defines between five slots 113 and twenty-five slots 113. In certain implementations, the slotted region 115 defines between ten slots 113 and twenty slots 113. In an example, the slotted region 115 defines about fifteen slots 113. In an example, the slotted region 115 defines about fourteen slots 113.

In an example, the slotted region 115 defines about sixteen slots 113. In an example, the slotted region 115 defines about twelve slots 113. In other implementations, the slotted region 115 can define any desired number of slots 113.

As shown in FIG. 8, the slotted region 115 of the tube body 111 has a length L2 that is generally shorter than the length L1 of the tube body 111. In some implementations, the length L2 of the axial region 115 is shorter than the length L1 of the tube body 111. In certain implementations, the length L2 extends along a majority of the length L1. In certain implementations, the length L2 is at least half of the length L1. In certain implementations, the length L2 is at least 60% of the length L1. In certain implementations, the length L2 is at least 70% of the length L1. In certain implementations, the length L2 is at least 75% of the length L1. In some implementations, each slot 113 extends the entire length L2 of the axial region 115. In other implementations, each slot 113 extends along a portion of the axial region 115.

In some implementations, a ratio of the length L2 of the slotted region 115 to a tube diameter D (FIG. 9) is about 1 to about 3. In certain implementations, the ratio of the length L2 of the slotted region 115 to the tube diameter D is about 1.5 to about 2. In certain examples, the ratio of the length L2 of the slotted region 115 to the tube diameter D is about 1.75. In certain examples, the tube diameter D is about 5 inches and the length L2 of the slotted region 115 is about 8 inches. In an example, each slot 113 of the slotted region 115 extends the length L2 of the slotted region 115.

As shown in FIG. 9, the slotted region 115 of the tube body 111 has a circumferential width S1 that is larger than a circumferential width S2 of a non-slotted region 116 of the tube body 111. The non-slotted region 116 defines a circumferential surface of the tube body 111 through which no slots are defined. In an example, the non-slotted region 116 defines a solid circumferential surface through which no openings are defined.

In some implementations, the circumferential width S2 of the non-slotted region 116 is significantly larger than a circumferential width of any portion of the tube body 111 extending between two adjacent slots 113 at the slotted region 115. For example, in certain examples, the circumferential width S2 of the non-slotted region 116 is at least double the circumferential width of any portion of the tube body 111 extending between two adjacent slots 113 at the slotted region 115. In certain examples, the circumferential width S2 of the non-slotted region 116 is at least triple the circumferential width of any portion of the tube body 111 extending between two adjacent slots 113 at the slotted region 115. In certain examples, the circumferential width S2 of the non-slotted region 116 is at least four times the circumferential width of any portion of the tube body 111 extending between two adjacent slots 113 at the slotted region 115. In certain examples, the circumferential width S2 of the non-slotted region 116 is at least five times the circumferential width of any portion of the tube body 111 extending between two adjacent slots 113 at the slotted region 115.

In some implementations, the circumferential width S1 of the slotted region 115 is substantially larger than the circumferential width S2 of the non-slotted region 116. In certain implementations, the circumferential width S1 of the slotted region 115 is at least twice the circumferential width S2 of the non-slotted region 116. In certain implementations, the circumferential width S1 of the slotted region 115 is about triple the circumferential width S2 of the non-slotted region 116.

In some examples, the slotted region 115 extends about 200° to about 350° around the tube body 111 and the non-slotted region 116 extends about 10° to about 160° around the tube body 111. In certain examples, the slotted region 115 extends about 210° to about 330° around the tube body 111 and the non-slotted region 116 extends about 30° to about 150° around the tube body 111. In an example, the slotted region 115 extends about 270° around the tube body 111 and the non-slotted region 116 extends about 90° around the tube body 111. In an example, the slotted region 115 extends about 300° around the tube body 111 and the non-slotted region 116 extends about 60° around the tube body 111. In an example, the slotted region 115 extends about 240° around the tube body 111 and the non-slotted region 116 extends about 120° around the tube body 111.

In some implementations, each slot 113 has a common width S3 (defined along the circumference of the tube body 111. In some implementations, the width S3 of each slot 113 is less than the circumferential width S2 of the non-slotted region 116. In certain implementations, the width S3 of each slot 113 is substantially less than the width S2 of the non-slotted region 116. In certain implementations, the width S3 of each slot 113 is less than half the width S2 of the non-slotted region 116. In certain implementations, the width S3 of each slot 113 is less than a third of the width S2 of the non-slotted region 116. In certain implementations, the width S3 of each slot 113 is less than a quarter of the width S2 of the non-slotted region 116. In certain implementations, the width S3 of each slot 113 is less than 20% the width S2 of the non-slotted region 116. In certain implementations, the width S3 of each slot 113 is less than 10% the width S2 of the non-slotted region 116.

In some implementations, the tube body 111 has a ratio of slot width S3 to tube diameter D (FIG. 9) of about 0.02 to about 0.2. In certain implementations, the ratio of slot width S3 to tube diameter D is about 0.05 to about 0.15. In certain implementations, the ratio of slot width S3 to tube diameter D is about 0.08 to about 0.12. In an example, the ratio of slot width S3 to tube diameter D is about 0.1. In certain examples, the slot width S3 is about 0.45 inches and the tube diameter D is about 5 inches. In other implementations, however, the slots 113 can have different widths.

In some implementations, the slots 113 are spaced evenly around the circumferential width S1 of the slotted region 115. In such implementations, gaps between adjacent slots 113 within the slotted region 115 have a circumferential width S4. In certain implementations, the circumferential width S4 of the gaps is larger than the circumferential width S3 of the slots 113. In certain implementations, the circumferential width S3 of the slots 113 is at least half of the circumferential width S4 of the gaps. In certain implementations, the circumferential width S3 of the slots 113 is at least 60% of the circumferential width S4 of the gaps. In certain implementations, the circumferential width S3 of the slots 113 is at least 75% of the circumferential width S4 of the gaps. In certain implementations, the circumferential width S3 of the slots 113 is at least 85% of the circumferential width S4 of the gaps. In other implementations, however, the gaps between the slots 113 can have different widths.

In some implementations, the width S4 of each gap is less than the circumferential width S2 of the non-slotted region 116. In certain implementations, the width S4 of each gap is substantially less than the width S2 of the non-slotted region 116. In certain implementations, the width S4 of each gap is less than half the width S2 of the non-slotted region 116. In certain implementations, the width S4 of each gap is less than a third of the width S2 of the non-slotted region 116. In certain implementations, the width S4 of each gap is less than a quarter of the width S2 of the non-slotted region 116. In certain implementations, the width S4 of each gap is less than 20% the width S2 of the non-slotted region 116. In certain implementations, the width S4 of each gap is less than 10% the width S2 of the non-slotted region 116.

In certain implementations, the slots 113 occupy about 25% to about 60% of the area of the slotted region 115. In certain implementations, the slots 113 occupy about 35% to about 55% of the area of the slotted region 115. In certain implementations, the slots 113 occupy less than about 50% of the area of the slotted region 115. In certain implementations, the slots 113 occupy about 45% of the area of the slotted region 115. In other words, the percentage of open area to closed area at the slotted region 115 is about 45%.

In some implementations, louvers 114 are disposed at the slotted region 115. In some implementations, each slot 113 has a corresponding louver 114. In other implementations, however, only a portion of the slots 113 have a corresponding louver 114. In some implementations, each louver 114 extends the length of the corresponding slot 113. In other implementations, a louver 114 can be longer or shorter than the corresponding slot 113.

As shown in FIG. 9, each louver 114 extends from a base 118 to a distal end 119 spaced from the tube body 111. In some implementations, the base 118 is coupled to the tube body 111. In other implementations, however, the base 118 can be spaced from the tube body 111 (e.g., suspended adjacent the tube body 111). In some implementations, the base 118 of each louver 114 is disposed at one end of a slot 113 so that the louver 114 extends at least partially over the slot 113 (e.g., see FIG. 9). In certain implementations, the louver 114 is sized to extend fully across the width S3 of the slot 113. In other implementations, the louver 114 extends only partially across the width S3 of the slot 113. In some implementations, the distal ends 119 of adjacent louvers 114 define gaps having a circumferential width S5. In certain implementations, the circumferential width S5 of the gaps is about equal to the circumferential width S3 of the slots 113 and the circumferential width S4 of the gaps.

In some implementations, each louver 114 extends straight from the slot 113 to define a plane. In certain implementations, the louvers 114 extend from the slot 113 at an angle θ relative to the tube body 111. In certain implementations, the angle θ is about 20° to about 70°. In an example, the angle θ is about 45°. In an example, the angle θ is about 40°. In an example, the angle θ is about 50°. In an example, the angle θ is about 35°. In certain implementations, the angle θ is about 30° to about 55°. In other implementations, each louver 114 defines a concave curve as the louver 114 extends away from the slot 113.

In some implementations, the tube body 111 has a louvered region over which the louvers 114 extend and a non-louvered region over which no louver extends. In some such implementations, the louvered region extends about 200° to about 350° around the tube body 111 and the non-louvered region extends about 10° to about 160° around the tube body 111. In certain examples, the louvered region extends about 210° to about 330° around the tube body 111 and the non-louvered region extends about 30° to about 150° around the tube body 111. In an example, the louvered region extends about 270° around the tube body 111 and the non-louvered region extends about 90° around the tube body 111. In certain examples, the louvered region largely corresponds with the slotted region 115. In an example, the louvered region overlaps the slotted region 115.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A mixing tube arrangement for swirling exhaust gases, the mixing tube arrangement comprising:

a tube body having a longitudinal axis extending along an interior passage from a first end of the tube body to a second end of the tube body, the tube body defining a slotted region and a non-slotted region, the slotted region defining a plurality of slots, the slotted region extending over a first continuous circumferential distance of the tube body and the non-slotted region extending over a second continuous circumferential distance of the tube body, the second circumferential distance being less than the first circumferential distance, and the second continuous circumferential distance being larger than a circumferential distance of any portion of the tube body extending between two adjacent slots at the slotted region, and the width of each slot being less than half of the second continuous circumferential distance; and a plurality of louvers disposed at the slots.

2. The mixing tube arrangement of claim 1, further comprising a doser disposed at the first end of the tube body, the doser being configured to dispense a reactant into exhaust flowing through the interior passage of the tube body.

3. The mixing tube arrangement of claim 1, wherein the slotted region extends along less than a full length of the tube body.

4. The mixing tube arrangement of claim 1, wherein a ratio of an axial length of each slot to a diameter of the tube body is 1.5 to 2.

5. The mixing tube arrangement of claim 4, wherein the ratio of the axial length of each slot to the diameter of the tube body is 1.75.

6. The mixing tube arrangement of claim 1, wherein the louvers extend away from the tube body at an angle of 45°.

7. The mixing tube arrangement of claim 1, wherein the slotted region extends along 210° to 330° of a circumference of the tube body.

8. The mixing tube arrangement of claim 7, wherein the slotted region extends along 270° of the circumference of the tube body.

9. The mixing tube arrangement of claim 1, wherein a ratio of a circumferential width of each slot to a diameter of the tube body is 0.05 to 0.15.

10. The mixing tube arrangement of claim 9, wherein the ratio of the circumferential width of each slot to the diameter of the tube body is 0.1.

11. The mixing tube arrangement of claim 1, wherein a diameter of the tube body is 5 inches, a circumferential width of each slot is 0.45 inches and a length of each slot is 8 inches.

12. The mixing tube arrangement of claim 11, wherein the slots define 45% of an area of the slotted region.

13. A dosing and mixing arrangement comprising:

a housing defining an inlet having an inlet axis, a mixing region, and an outlet having an outlet axis, the outlet axis being generally orthogonal to the inlet axis;

a mixing tube arrangement disposed within the mixing region of the housing, the mixing tube arrangement including a tube body defining an interior passage that extends along the outlet axis, the tube body having a circumferential surface extending across the inlet axis, the circumferential surface having a continuous louvered region and a continuous non-louvered region, the louvered region defining a plurality of louvers extending outwardly from a circumferential surface of the tube body, the non-louvered region being free of louvers, the non-louvered region having a circumferential width that is larger than a circumferential width of a portion of the tube body extending between two adjacent louvers at the louvered region, the tube body also defining a plurality of slots that extend through the circumferential surface of the tube body, each louver being associated with at least one slot, each slot having a common width defined along a circumference of the tube body.

14. The dosing and mixing arrangement of claim 13, wherein the mixing tube arrangement touches an interior portion of the housing.

15. The dosing and mixing arrangement of claim 14, wherein a distal end of one of the louvers contacts the interior portion of the housing.

16. The dosing and mixing arrangement of claim 13, wherein the mixing tube arrangement is offset within the housing to define a high pressure zone and a flow zone.

17. The dosing and mixing arrangement of claim 13, wherein the mixing tube arrangement defines the outlet of the housing.

18. The dosing and mixing arrangement of claim 13, wherein at least a portion of the louvered region faces towards the inlet.

19. The dosing and mixing arrangement of claim 13, wherein at least a portion of the non-louvered region faces away from the inlet.

20. The dosing and mixing arrangement of claim 13, wherein an area of the louvered region extends over 270° of the circumferential surface of the tube body.

21. The mixing tube arrangement of claim 1, wherein the slotted region extends over a majority of an axial length of the mixing tube.

* * * * *